(12) United States Patent
Dong et al.

(10) Patent No.: US 10,011,372 B2
(45) Date of Patent: Jul. 3, 2018

(54) SYSTEMS AND METHODS FOR SHIELDING STRUCTURES FROM RADIATION AND MAGNETIC FIELD EXPOSURE

(71) Applicant: THE BOEING COMPANY, Chicago, IL (US)

(72) Inventors: Jian Dong, Irvine, CA (US); Naveed Moayyed Hussain, Palos Verdes Peninsula, CA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 14/926,669

(22) Filed: Oct. 29, 2015

(65) Prior Publication Data

US 2017/0121038 A1 May 4, 2017

(51) Int. Cl.
*B64G 1/00* (2006.01)
*B64G 1/54* (2006.01)
*B64G 1/52* (2006.01)

(52) U.S. Cl.
CPC ............. *B64G 1/543* (2013.01); *B64G 1/546* (2013.01); *B64G 2001/525* (2013.01)

(58) Field of Classification Search
CPC ... B64G 1/543; B64G 1/546; B64G 2001/525
USPC .................................. 250/505.1; 244/171.7
See application file for complete search history.

(56) References Cited

U.S. PATENT DOCUMENTS

| | | | |
|---|---|---|---|
| 7,484,691 B2 * | 2/2009 | Kinstler | B64G 1/54 174/353 |
| 8,210,481 B2 | 7/2012 | Kinstler | |
| 8,405,057 B1 * | 3/2013 | Kinstler | G21F 3/00 244/171.7 |
| 8,809,824 B1 * | 8/2014 | Kinstler | B64G 1/54 244/171.1 |
| 2011/0049303 A1 | 3/2011 | Bamford | |
| 2013/0037656 A1 * | 2/2013 | Messano, Jr. | G21F 3/00 244/171.7 |

* cited by examiner

*Primary Examiner* — Michael Maskell
(74) *Attorney, Agent, or Firm* — Joseph M. Butscher; The Small Patent Law Group, LLC

(57) ABSTRACT

A system is configured to shield an interior chamber of a structure. The system may include a power source, an outer shield assembly operatively connected to the power source and coupled to an outer wall of the structure, and an inner shield assembly surrounding the internal chamber. The outer shield assembly generates a magnetic field through and around the structure. The inner shield assembly deflects radiation particles away from the interior chamber and re-directs portions of the magnetic field around the interior chamber.

20 Claims, 5 Drawing Sheets

SYSTEMS AND METHODS FOR SHIELDING STRUCTURES FROM RADIATION AND MAGNETIC FIELD EXPOSURE

FIELD OF THE DISCLOSURE

Embodiments of the present disclosure generally relate to shielding systems and methods, such as may be used in spacecraft, and, more particularly, to shielding systems and methods that are configured to shield an internal chamber of a structure from radiation and magnetic field exposure.

BACKGROUND OF THE DISCLOSURE

Ionizing radiation typically has sufficient energy to remove electrons from orbits of atoms, thereby generating charged particles. Another type of radiation is non-ionizing radiation, which typically does not have sufficient energy to remove electrons from their orbits. Radiation in outer space typically includes ionizing radiation, which may be manifested as high energy, charged particles. Examples of ionizing radiation include gamma rays, protons, neutrons, and the like. Ionizing radiation may damage human tissues and cells, which can lead to cancer and/or death. Ionizing radiation may also damage instrument and communication systems on board space vehicles, stations, and the like.

The sun occasionally releases significant amounts of ionizing radiation as charged particles during events known as coronal mass ejectas ("CMEs"). The charged particles released during CMEs include electrons, protons, and heavy ions. Such ionizing radiation may severely damage human cells, as well as sensitive electronic components and other devices. Therefore, even though CMEs are relatively uncommon occurrences, the amounts of radiation they potentially inflict upon a crew and equipment of a spacecraft gives rise for a need to shield part or all of such spacecraft from such radiation.

Shielding from proton and heavy ion radiation may generally be accomplished by either absorbing the particles or by deflecting the particles. To absorb the radiation, materials having a thickness sufficient for the amount of energy expected from the radiation may be disposed around an area that houses the crew and/or sensitive equipment during a CME. However, because of the weight of such a housing, the use of radiation-absorbing material is typically impractical for space exploration and other applications. Additionally, the absorption of high energy particles releases a different form of radiation such as gamma rays and X-rays that pass through the shielding material and may harm the crew and/or equipment.

On the other hand, active radiation shielding deflects radiation particles instead of absorbing them. One example of active radiation shielding of CME radiation is the magnetosphere of the Earth, which creates a magnetic field of enough flux density to change the trajectory of such radiation particles from the sun or elsewhere, thereby causing the radiation to be diverted away from the Earth.

One known system for active radiation shielding uses an external solenoid magnetic field. Another known system for active radiation shielding includes a conductive ring through which electric current flows. A magnetic field is generated through the electric current flowing through the conductive ring.

However, known systems for active radiation shielding typically deflect ion particles only in certain directions. For example, one known system provides radiation protection in a single direction, while another known system leaves end areas of a spacecraft exposed and unprotected. Additionally, the known systems typically do not shield individuals and instruments from electromagnetic radiation within a spacecraft. Long periods of exposure to electromagnetic radiation adversely impact human health and instrument performance.

SUMMARY OF THE DISCLOSURE

A need exists for a system and a method of radiation shielding that are configured to deflect ion particles in all directions. A need exists for a system and a method of radiation shielding that protect all areas of an internal chamber of a structure (so as not expose end portions to radiation). A need exists for a system and a method of radiation shielding that are effective over long periods of time (for example, months or years). A need exists for a system and a method of protecting against long term exposure to magnetic fields.

With those needs in mind, certain embodiments of the present disclosure provide a system for shielding an interior chamber of a structure. The system may include a power source, an outer shield assembly operatively connected to the power source and coupled to an outer wall of the structure, and an inner shield assembly surrounding the internal chamber. The outer shield assembly generates a magnetic field through and around the structure. The inner shield assembly deflects radiation particles away from the interior chamber and re-directs portions of the magnetic field around the interior chamber.

The outer shield assembly may include a helical coil. In at least one embodiment, the helical coil is secured to an outer surface of the outer wall. In at least one other embodiment, the helical coil is secured to an inner surface of the outer wall. In at least one other embodiment, the helical coil is embedded within the outer wall.

The inner shield assembly may include one or more ferromagnetic sheets. In at least one embodiment, the inner shield assembly may include a spherical main body. In at least one other embodiment, the inner shield assembly may include a first shield having first angled walls that are non-parallel and non-orthogonal with respect to a longitudinal axis of the magnetic field. The inner shield assembly may also include a second shield surrounding the first shield. The second shield may have second angled walls that are non-parallel and non-orthogonal with respect to the longitudinal axis of the magnetic field.

In at least one embodiment, the outer shield assembly is configured to generate the magnetic field as a multipole magnetic field.

Certain embodiments of the present disclosure provide a method for shielding an interior chamber of a structure. The method may include coupling an outer shield assembly to an outer wall of the structure, enclosing the internal chamber of the structure with an inner shield assembly, operatively connecting a power source to the outer shield assembly, applying power from the power source to the outer shield assembly to generate a magnetic field through and around the structure, deflecting radiation particles away from the interior chamber with the inner shield assembly, and re-directing portions of the magnetic field around the interior chamber with the inner shield assembly.

Certain embodiments of the present disclosure provide a spacecraft that may include a fuselage defining an internal chamber, and a shielding system that shields the internal chamber from radiation and exposure to magnetic fields. The shielding system may include an outer shield assembly operatively connected to a power source and coupled to an outer wall of the structure, and an inner shield assembly surrounding the internal chamber. The outer shield assembly generates a magnetic field through and around the structure. The inner shield assembly deflects radiation particles away from the interior chamber and re-directs portions of the magnetic field around the interior chamber.

DETAILED DESCRIPTION OF THE DISCLOSURE

Figure 1:
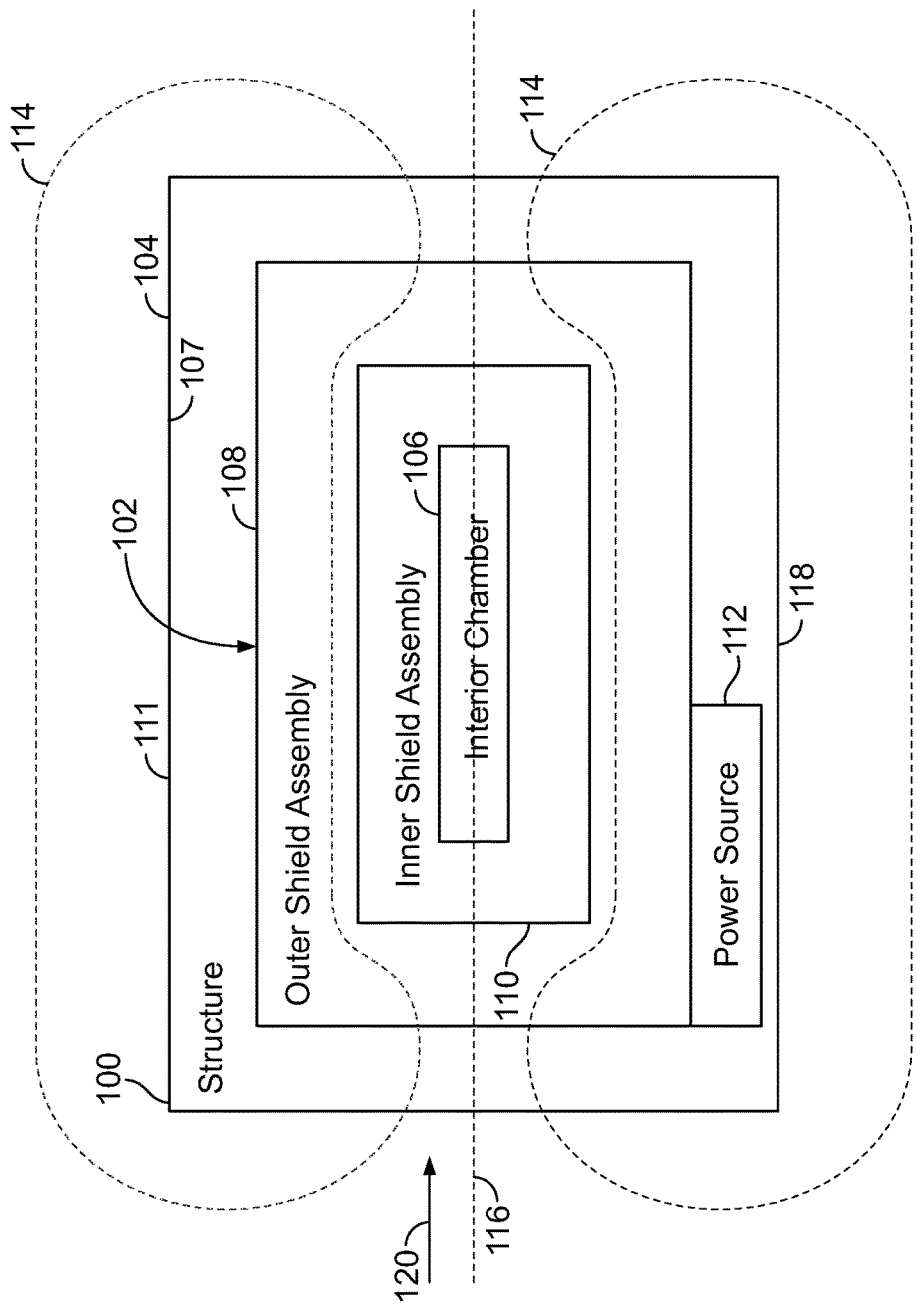
FIG. 1 illustrates a schematic block diagram of a structure including a shielding system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a shielding system and method that may include an outer shield assembly that is coupled to an outer portion (such as an outer fuselage wall) of a structure (such as a spacecraft). For example, the outer shield assembly may be secured to an outer or inner surface of the outer portion of the spacecraft. In at least one embodiment, the outer shield assembly may be embedded within the outer portion of the spacecraft. The outer shield assembly may include one or more solenoid coils configured as dual poles or multi-poles for different spacecraft configurations in order to generate an effective magnetic field that shields an internal chamber from radiation (such as ionized and non-ionized radiation) from all directions.

The shielding system and method may also include an inner shield assembly surrounding an internal chamber of a spacecraft. The inner shield assembly may include one or more ferromagnetic material sheets, which may be shaped as spheres, angled compartments, or the like, that surround the internal chamber. The inner shield assembly protects individuals and instruments within the internal chamber from strong magnetic fields, and alters a magnetic field that may be generated by the outer shield assembly to prevent ion particles that are traveling parallel to the generated magnetic field to penetrate into the spacecraft.

Embodiments of the present disclosure provide systems and methods that deflect ion particle radiation from all directions, and shield individuals and instruments from long term exposure to magnetic fields. The outer shield assembly, which may be coupled to an outer portion of a structure (such as a spacecraft), may also protect the structure from lighting strikes, such as when a spacecraft flies through an atmosphere, such as during launch and landing sequences.

Embodiments of the present disclosure provide systems and methods for radiation and magnetic field shielding. As such, embodiments of the present disclosure provide systems and methods that protect individuals and instruments aboard a spacecraft or other such structure from long term exposure to radiation and magnetic fields, which may be present in outer space, nuclear power plants, and/or the like.

In at least one embodiment, a shielding system may include an outer shield assembly having conductive members (such as wires, coils, strips, straps, beams, and/or the like) coupled to an outer portion of a structure (such as a spacecraft, land-based station, or the like). The conductive members may couple to the outer portion in a helical arrangement. In at least one embodiment, the outer shield assembly may include bi-pole or other multipole arrangements that are configured to generate magnetic fields when connected to a source of power when an electric current flows therethrough. The systems and methods may also include an inner shield assembly that may include one or more ferromagnetic sheets inside the structure. The inner shield assembly protects individuals and/or equipment within the internal chamber from exposure to magnetic fields, such as a magnetic field generated by the outer shield assembly. The inner shield assembly may alter the magnetic flux of the magnetic field so that the altered magnetic field deflects ion particles that initially extend in the same direction as the magnetic flux to achieve ion radiation shielding in all directions.

Certain embodiments of the present disclosure include a shielding system and method that may include an outer shield assembly, which may employ conductive members (such as strips, wires, beams, straps, belts, coils, or the like) that are configured to create Lorentz forces. The shield system and method may also include an inner shield assembly, which may include one or more ferromagnetic sheets, that is configured to protect against long term exposure to radiation and magnetic fields.

FIG. 1 illustrates a schematic block diagram of a structure 100 including a shielding system 102, according to an embodiment of the present disclosure. The structure 100 may be or include a vehicle, such as a spacecraft, a space station, a land-based station, or the like. The structure 100 may be shaped as a cylinder, such as a portion of a fuselage of a spacecraft. In at least one embodiment, the structure 100 is a fuselage of a spacecraft, such as a space shuttle or vehicle, a satellite, and/or the like. The structure 100 includes an outer wall 104 (such as an outer portion of a fuselage) and an internal chamber 106, which may be defined by an interior surface 107 of the outer wall 104. The internal chamber 106 may be or include a cockpit, control center, cabin, room, cargo area, and/or the like within the structure 100. Individuals and equipment may be within the internal chamber 106.

The shielding system 102 may include an outer shield assembly 108 coupled to the outer wall 104 and an inner shield assembly 110 surrounding the interior chamber 106. The inner shield assembly 110 is disposed between the interior chamber 106 and the outer shield assembly 108. The outer shield assembly 108 may surround an outer surface 111 of the outer wall 104. For example, the outer shield assembly 108 may include one or more conductive members (such as conductive strips, straps, wires, coils, beams, or the like) that wrap around the outer surface 111. In at least one embodiment, the conductive member(s) wraps around the outer surface 111 in a helical pattern. Optionally, the outer shield assembly 108 may be secured to the inner surface 107 of the outer wall 104. In at least one other embodiment, the outer shield assembly 108 may be embedded within the outer wall 104.

The outer shield assembly 108 is operatively connected to a power source 112, such as one or more batteries, engines, solar cells, and/or the like, that is configured to generate direct current (DC) power, for example. The power source 112 provides current to the outer shield assembly 108. As the current flows through the outer shield assembly 108, a magnetic field 114 is generated around the structure 100, such as described in U.S. Pat. No. 8,210,481, entitled "Spacecraft Having a Magnetic Space Radiation Shield," which is hereby incorporated by reference in its entirety. The generated magnetic field 114 deflects ion radiation directed toward the structure 100.

The inner shield assembly 110 may encase, enclose, or otherwise surround the interior chamber 106. The inner shield assembly 110 may include one or more protective sheets, which may be formed of one or more ferromagnetic materials, such as iron, nickel, cobalt, alloys thereof, and/or the like. The inner shield assembly 110 may have a thickness of one inch or less. Optionally, the thickness of the inner shield assembly 110 may be greater that one inch. The thickness of the inner shield assembly 110 and the number of protective sheets may be directly proportional to the type and strength of ion radiation that is to be deflected. For example, the thickness of the inner shield assembly 110 may be greater for stronger ion radiation and thinner for weaker ion radiation. The inner shield assembly 110 is configured to protect the interior chamber 106 from ion particles that travel in a direction that is parallel to a longitudinal axis 116 of the generated magnetic field 114. As such, the inner shield assembly 110 shields the interior chamber 106 from ion radiation that may be directed into ends 118 of the structure 100.

The inner shield assembly 110 is also configured to direct the magnetic field 114 around the interior chamber 106. The inner shield assembly 110 may shield the interior chamber 106 from the generated magnetic field 114. In this manner, the inner shield assembly 110 may protect individuals and equipment within the interior chamber 106 from long term exposure to the magnetic field 114.

As noted, the outer shield assembly 108 is configured to generate the magnetic field 114 around the structure 100. The generated magnetic field 114 deflects ion radiation directed toward the structure 100. As such, the outer shield assembly 108 may be an active shielding component. The inner shield assembly 110 may be a passive shielding component that surrounds the interior chamber 106 and shields the interior chamber from ion radiation and exposure to the magnetic field 114.

Based on the Lorentz force law, a charged particle moving in a magnetic field (such as the magnetic field 114) experiences a sideways force that is proportional to the strength of the magnetic field, the component of the velocity that is perpendicular to the magnetic field and the charge of the particle. In particular, $$F = qV \times B$$

where F is the force, q is the electric charge of the particle, v is the instantaneous velocity of the particle, and B is the magnetic field (in Teslas). When a radiation particle (such as the ion particle 120) travels parallel to the longitudinal axis 116 of magnetic field 114, the radiation particle may not be deflected. As such, the ion particle 120 may pass into the structure 100. Even though the ion particle 120 passes into the structure, the inner shield assembly 110 deflects the ion particle 120 away from the interior chamber 106. At the same time, the inner shield assembly 110 directs the magnetic field 114 around the interior chamber 106, so that the magnetic field 114 does not pass into the interior chamber 106.

Figure 2:
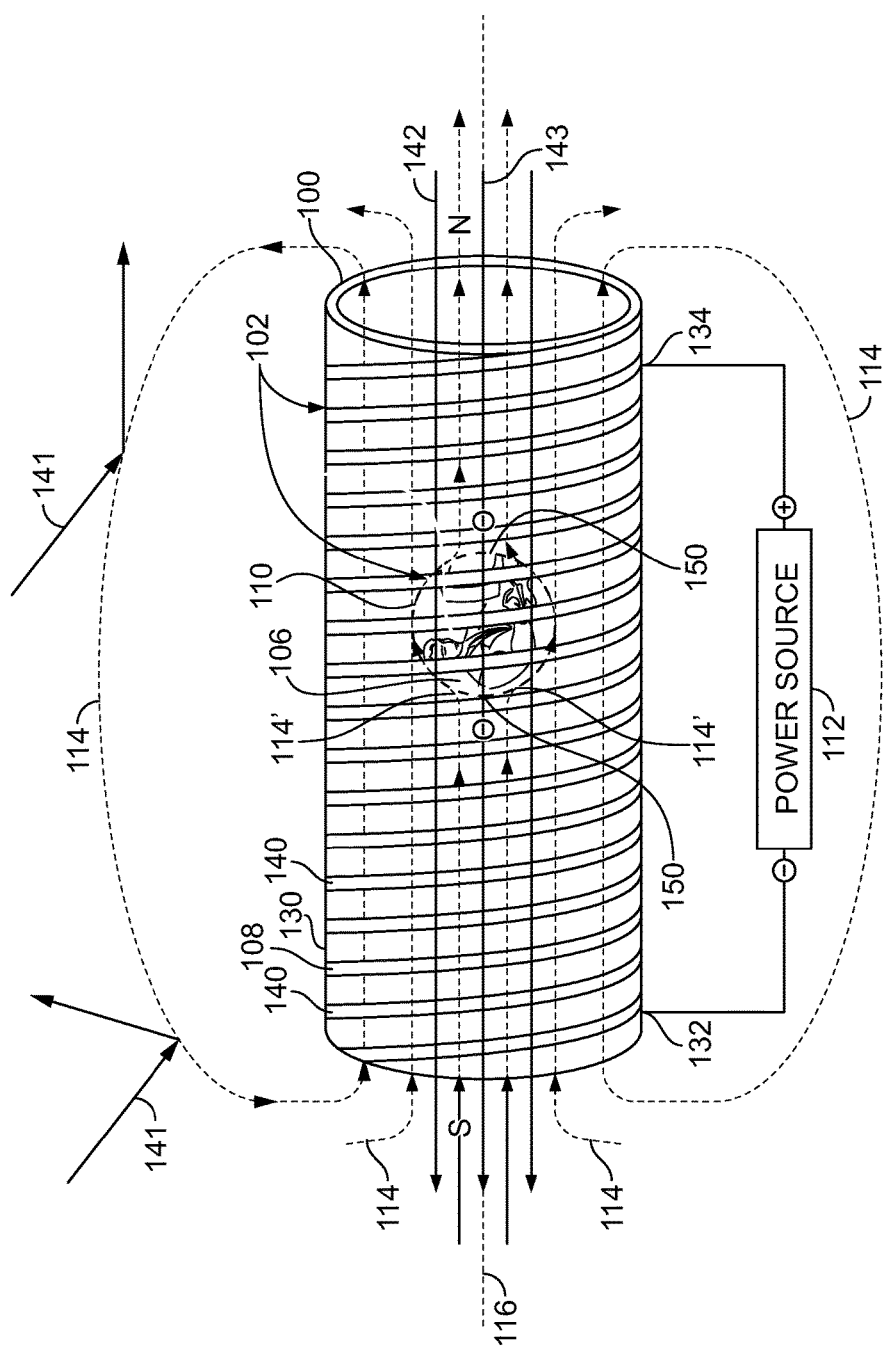
FIG. 2 illustrates a schematic diagram of a structure including a shielding system, according to an embodiment of the present disclosure.

FIG. 2 illustrates a schematic diagram of the structure 100 including the shielding system 102, according to an embodiment of the present disclosure. The structure 100 may include a cylindrical main body 130. The outer shield assembly 108 may include at least one conductive member 140 that is coupled to the outer wall 104 of the cylindrical main body 130. For example, the conductive member(s) 140 may include a helical coil that wraps around the outer wall 104 in a helical pattern. Opposite ends 132 and 134 of the conductive member(s) 140 are connected to the power source 112, which provides electric current to the conductive member(s) 140. As current flows through the helical conductive member(s) 140, the magnetic field 114 is generated around and through the structure 100. The generated magnetic field 114 deflects ion particles 141 away from the structure 100.

However, ion particles 142 that travel parallel to the longitudinal axis 116 of the magnetic field 114 may penetrate into the structure 100. The inner shield assembly 110 prevents, minimizes, or otherwise reduces the ion particles 142 from passing into the internal chamber 106. For example, the inner shield assembly 110 may be or include a spherical main body formed from one or more ferromagnetic strips that encases or otherwise surrounds the internal chamber. As such, the inner shield assembly 110 blocks the ion radiation from passing into the internal chamber 106.

Additionally, the spherical inner shield assembly 110 directs the magnetic field 114 around the internal chamber 106. In this manner, the inner shield assembly 110 prevents, minimizes, or otherwise reduces the possibility of the magnetic field 114 entering the internal chamber 106.

Notably, however, an ion particle 143 may still pass through the internal chamber 106. Because the magnetic field lines 114' are re-directed by the spherical inner shield assembly 110 along outer surfaces thereof, opposite ends 150 of the spherical inner shield assembly 110 may not be protected by the magnetic field 114. As such, the ends 150 may provide paths for the ion radiation 143 to pass therethrough. Nevertheless, the inner shield assembly 110 protects the interior chamber 106 from the vast majority of ion particles that may pass into the ends of the structure 100.

In at least one other embodiment, the inner shield assembly 110 may include a first shield enclosed by a second shield. The dual shield nature provides shielding redundancy that may block the ion radiation from entering into the internal chamber 106.

Figure 3:
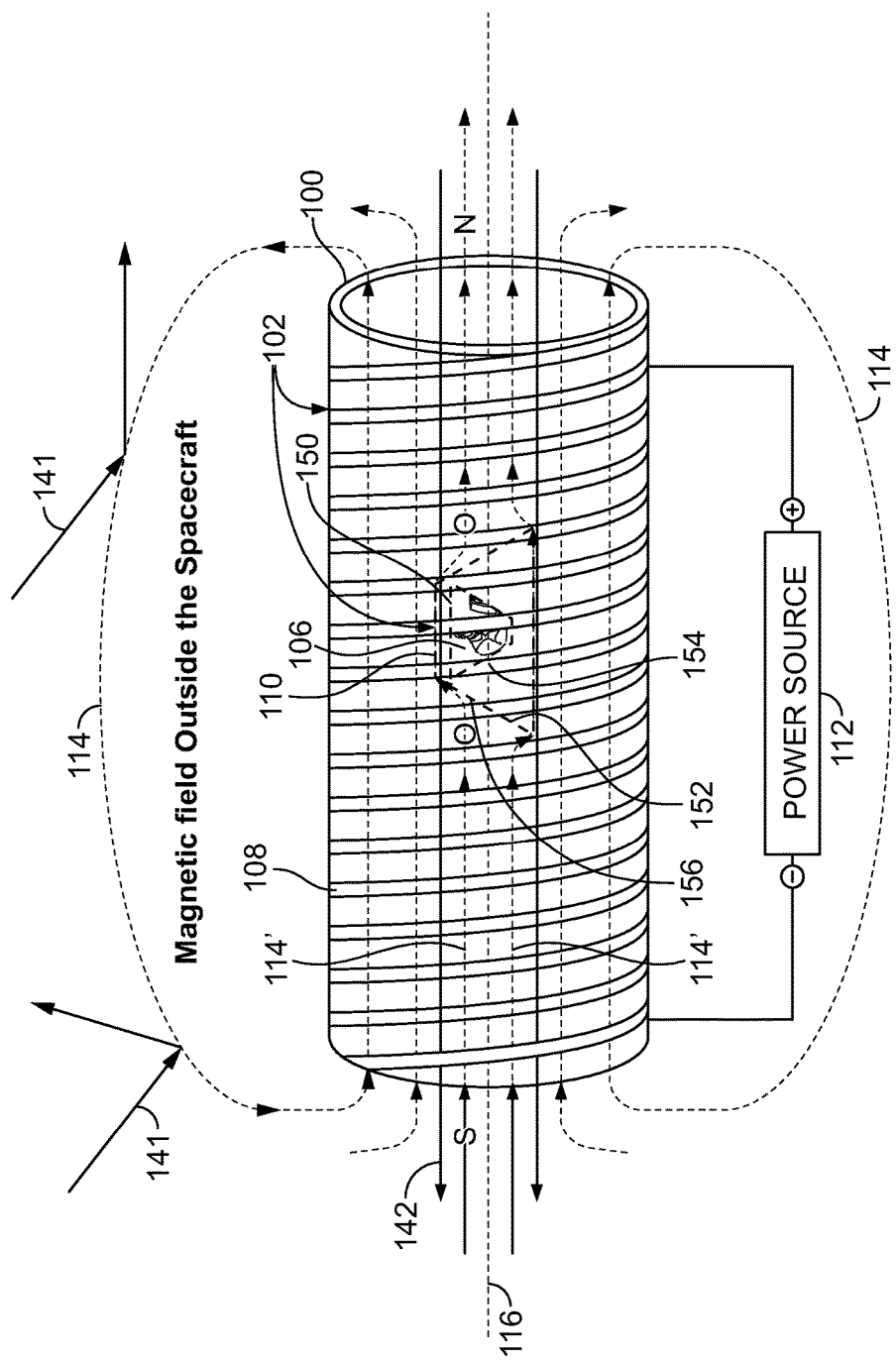
FIG. 3 illustrates a schematic diagram of a structure including a shielding system, according to an embodiment of the present disclosure.

FIG. 3 illustrates a schematic diagram of the structure 100 including the shielding system 102, according to an embodiment of the present disclosure. In this embodiment, the inner shield assembly 110 may include a first shield 150 within a second shield 152. Both the first and second shields 150 may include respective outer walls 154 and 156 that are angled with respect to the longitudinal axis 116. The walls 154 may not be orthogonal or parallel with respect to the longitudinal axis 116. That is, no portion of the walls of the first shield 150 may be perpendicular or parallel to the longitudinal axis 116. In at least one embodiment, no portion of end and side walls of the may be parallel or orthogonal to the longitudinal axis, whereas a base and/or ceiling may include portions that are parallel to or perpendicular to the longitudinal axis 116.

The first and second shields 150 and 152 provide the interior chamber 106 with a double layer of protection from ion radiation. Further, because the first and second shields 150 and 152 of the inner shield assembly 110 are formed of a ferromagnetic material, the inner shield assembly 110 alters the direction of the magnetic field lines 114' within the structure 102 so that radiation particles (through the Lorentz force) and the magnetic field lines 114' are directed around the internal chamber 106. The first and second shields 150 and 152 are sized and shaped so that the magnetic field lines 114' are not parallel or perpendicular to the longitudinal axis 116. That is, the walls of the first and second shields 150 and 152 may be non-parallel and non-orthogonal to the longitudinal axis 116. As such, ion particles 142 that penetrate ends of the structure 100 are deflected by the Lorentz force away from the internal chamber 106. The first and second shields 150 and 152 provide increased ion radiation protection, such as if the magnetic field in the first shield 150 is (by itself) insufficient to generate sufficient Lorentz force to completely deflect the ion particles. Further, it has been found that the angled nature of the walls 154 and 156 reduces the possibility of ion particles passing through either of the first or second shields 150 or 152.

Optionally, the inner shield assembly 110 may include more or less shields than the first and second shields 150 and 152. For example, one of the shields 150 or 152 may be used if able by itself to deflect the ion particles. In at least one other embodiment, three, four, five, or more shields may be used.

Figure 4:
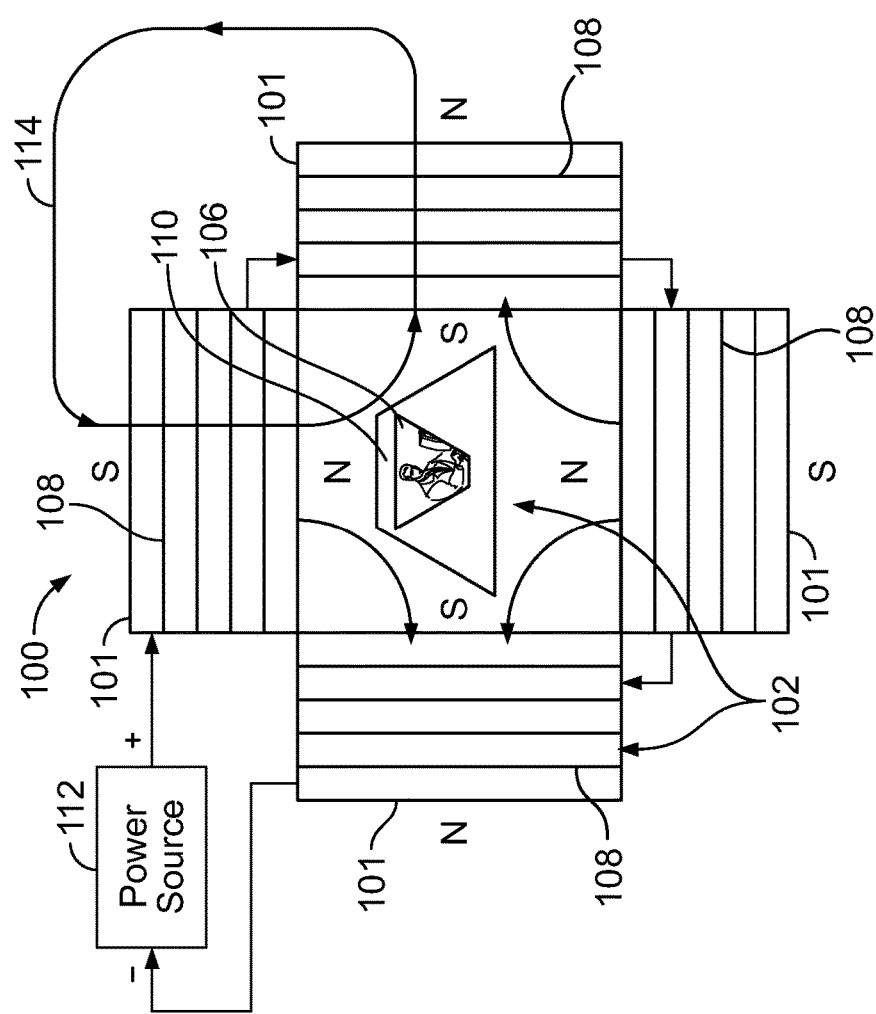
FIG. 4 illustrates a schematic diagram of a structure including a shielding system, according to an embodiment of the present disclosure.

FIG. 4 illustrates a schematic diagram of the structure 100 including the shielding system 102, according to an embodiment of the present disclosure. As shown in FIG. 4, embodiments of the present disclosure may be used to generate multi-pole (quadrapole, as shown in FIG. 4) magnetic fields for both ion and non-ion radiation protection. As shown, the structure 100 may include a plurality of bodies (such as cylindrical bodies) 101, each of which may include an outer shield assembly 108 coupled thereto. An inner shield assembly 110 such as any of those described above may surround an interior chamber 106. Optionally, embodiments of the present disclosure may be used to generate magnetic fields having more or less than a quadrapole configuration.

For a solenoid coil (such as may be formed by one or more conductive members of the outer shield assembly 108), the magnetic flux density inside the coil is proportional to the electric current and the number of turns of the coil. To protect against all different types of space radiation (for example, trapped radiation, galactic cosmic radiation (GCR), and solar particle events (SPE)), magnetic flux density may vary from $1 \times 10^{-4}$ Tesla to 10 Tesla, for example. To achieve high magnetic flux density, (such as 10 Tesla), the conductive members of the outer shield assembly 108 may be formed of a superconductive material (such as magnesium diboride or nano-carbone). The inner shield assembly 110 may be formed of thin ferromagnetic material sheets that may be formed from a variety of metals and their alloys, such as cobalt, iron, nickel, gadolinium, dysprosium, permalloy, awaruite, wairakite, magnetite, and/or the like. For example, the material used to form the conductive members of the inner shield assembly 110 may be selected based on permeability (a ratio of the magnetic induction output (B) to the magnetic field strength input (H) that produces the induction. The higher the permeability, the better the magnetic performance), flux density (also known as saturation induction—a material with high flux density or strength allows development of a strong magnetic field), cost, and/or weight.

As shown in FIG. 4, the bodies 101 may be linked together and connected to the power source 112. The outer shield assembly 110 may include a plurality of bodies that may connect together to generate a magnetic field 114 that protects the internal chamber 106 within an irregularly-shaped structure 100 from ion radiation.

Referring to FIGS. 1-4, embodiments of the present disclosure provide a radiation protection vessel that may include a structural conduit (such as the structure 102), the outer shield assembly 108, which may include a conductive strip wrapped around the structural conduit in a helical configuration, and the power source 112 coupled to the outer shield assembly 108. Power applied to the outer shield assembly 108 generates the magnetic field 114 around and through the structural conduit. The radiation protection vessel may also include the inner shield assembly 110, which may include at least one ferromagnetic sheet shaped to form an enclosure of a desired volume. At least two sides of the enclosure may delineate a non-parallel and non-orthogonal intersection with the magnetic field lines.

Embodiments of the present disclosure provide a method of radiation protection that may include providing a structural conduit with an outer shield assembly coupled thereto. For example, the outer shield assembly may be wrapped around the structural conduit in a helical configuration. The method may also include connecting a power source to the outer shield assembly, and generating a magnetic field through and around the structural conduit when power is applied to the outer shield assembly. The method may also include forming an inner shield assembly around an internal chamber. The inner shield assembly may provide an enclosure around the internal chamber. The inner shield assembly may be formed of a ferromagnetic material. The outer walls of the inner shield assembly may be oriented to redirect magnetic flux to deflect ion particles flowing parallel to a longitudinal axis of the generated magnetic field.

Figure 5:
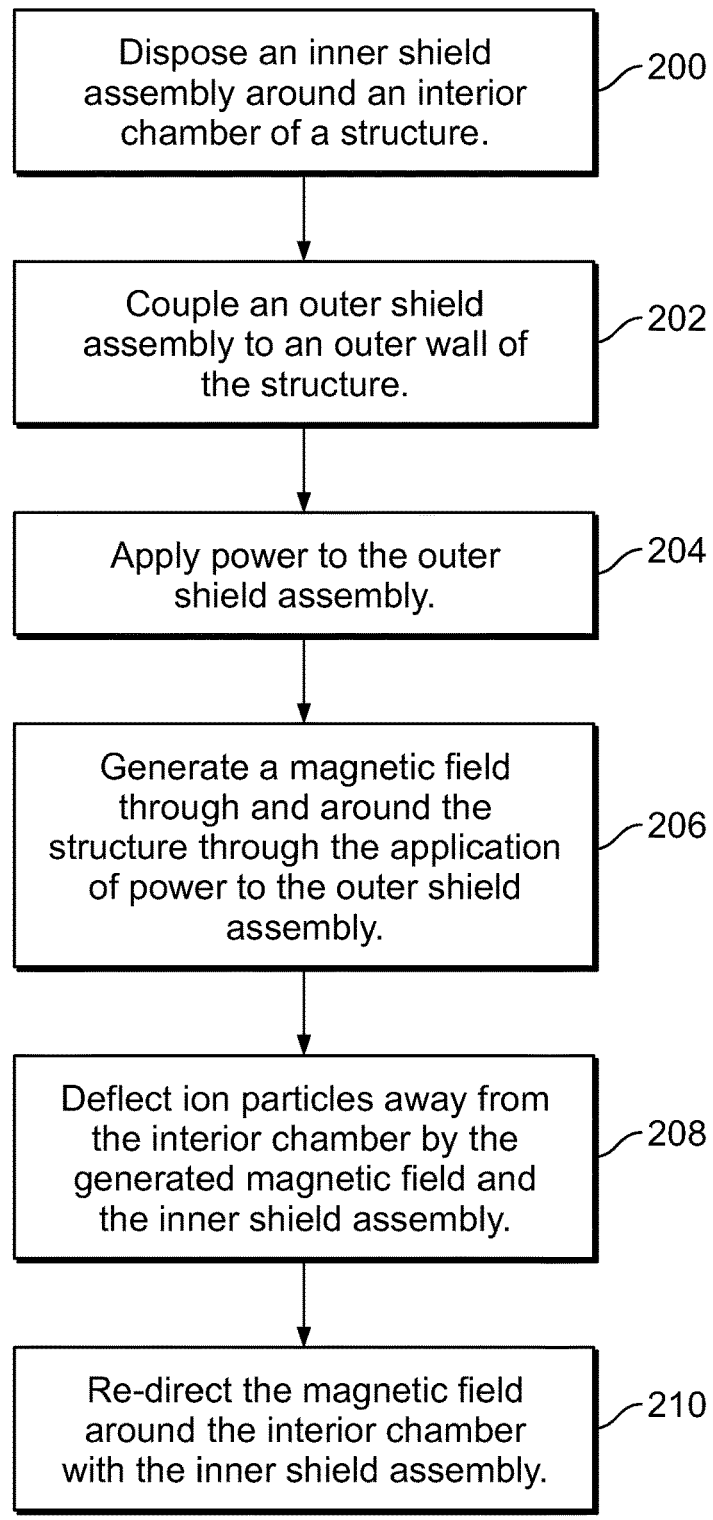
FIG. 5 illustrates a flow chart of a method of shielding an interior chamber of a structure from ion radiation and magnetic field exposure, according to an embodiment of the present disclosure.

FIG. 5 illustrates a flow chart of a method of shielding an interior chamber of a structure from ion radiation and magnetic field exposure, according to an embodiment of the present disclosure. At 200, an inner shield assembly is disposed around an interior chamber of a structure. The inner shield assembly may include one or more shields that enclose the interior chamber. The inner shield assembly may be shaped as a sphere, or enclosure having walls, at least some of which are non-parallel and non-orthogonal to a longitudinal axis of the structure (and/or a magnetic field generated through the structure).

At 202, an outer shield assembly is coupled to an outer wall of the structure. For example, the outer shield assembly may be secured to an outer or inner surface of the outer wall. In at least one other embodiment, the outer shield assembly may be embedded within the outer wall. A power source is coupled to the outer shield assembly.

At 204, power is applied to outer shield assembly. At 206, a magnetic field is generated through and around the structure through the application of power to the outer shield assembly.

At 208, ion particles are deflected away from the interior chamber by the generated magnetic field and the inner shield assembly. At 210, the magnetic field is re-directed around the interior chamber by the inner shield assembly.

Referring to FIGS. 1-5, embodiments of the present disclosure provide systems and methods of radiation shielding that are able to deflect ion particles in all directions. Embodiments of the present disclosure provide systems and methods of radiation shielding that protect all areas of an internal cabin of a spacecraft (so as not expose end portions to radiation). Embodiments of the present disclosure provide systems and methods of radiation shielding that are effective over long periods of time. Further, embodiments of the present disclosure provide systems and methods that protect against long term exposure to magnetic fields.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for shielding an interior chamber of a structure, the system comprising:
    a power source;
    an outer shield assembly operatively connected to the power source and coupled to an outer wall of the structure, wherein the outer shield assembly generates a magnetic field through and around the structure; and
    an inner shield assembly surrounding the interior chamber, wherein the inner shield assembly deflects radiation particles away from the interior chamber and re-directs portions of the magnetic field around the interior chamber, wherein the inner shield assembly comprises: a first shield having first angled walls that are non-parallel and non-orthogonal with respect to a longitudinal axis of the magnetic field; and a second shield surrounding the first shield, wherein the second shield has second angled walls that are non-parallel and non-orthogonal with respect to the longitudinal axis of the magnetic field.

2. The system of claim 1, wherein the outer shield assembly comprises a helical coil.

3. The system of claim 2, wherein the helical coil wraps around an outer surface of the outer wall.

4. The system of claim 2, wherein the helical coil is secured to an inner surface of the outer wall.

5. The system of claim 2, wherein the helical coil is embedded within the outer wall.

6. The system of claim 1, wherein the inner shield assembly comprises one or more ferromagnetic sheets.

7. The system of claim 1, wherein the outer shield assembly is configured to generate the magnetic field as a multipole magnetic field.

8. A method for shielding an interior chamber of a structure, the method comprising:
    coupling an outer shield assembly to an outer wall of the structure;
    enclosing the interior chamber of the structure with an inner shield assembly, wherein the enclosing operation comprises: enclosing the interior chamber with a first shield of the inner shield assembly, wherein the first shield has first angled walls that are non-parallel and non-orthogonal with respect to a longitudinal axis of the magnetic field; and surrounding the first shield with a second shield of the inner shield assembly, wherein the second shield has second angled walls that are non-parallel and non-orthogonal with respect to the longitudinal axis of the magnetic field;
    operatively connecting a power source to the outer shield assembly;
    applying power from the power source to the outer shield assembly to generate a magnetic field through and around the structure;
    deflecting radiation particles away from the interior chamber with the inner shield assembly; and
    re-directing portions of the magnetic field around the interior chamber with the inner shield assembly.

9. The method of claim 8, wherein the coupling operation comprises wrapping the outer shield assembly around an outer surface of the outer wall.

10. The method of claim 8, wherein the coupling operation comprises securing the outer shield assembly to an inner surface of the outer wall.

11. The method of claim 8, wherein the coupling operation comprises embedding the outer shield assembly within the outer wall.

12. The method of claim 8, wherein the inner shield assembly comprises one or more ferromagnetic sheets.

13. The method of claim 8, wherein the applying power operation comprises generating the magnetic field as a multipole magnetic field.

14. A spacecraft comprising:
a fuselage defining an interior chamber; and
a shielding system that shields the interior chamber from radiation and exposure to magnetic fields, wherein the shielding system comprises:
  a power source;
  an outer shield assembly operatively connected to the power source and coupled to an outer wall of the structure, wherein the outer shield assembly generates a magnetic field through and around the structure; and
  an inner shield assembly surrounding the interior chamber, wherein the inner shield assembly deflects radiation particles away from the interior chamber and re-directs portions of the magnetic field around the interior chamber, wherein the inner shield assembly comprises: a first shield having first angled walls that are non-parallel and non-orthogonal with respect to a longitudinal axis of the magnetic field; and a second shield surrounding the first shield, wherein the second shield has second angled walls that are non-parallel and non-orthogonal with respect to the longitudinal axis of the magnetic field.

15. The spacecraft of claim 14, wherein the outer shield assembly comprises a helical coil that is one of embedded within, secured to an outer surface of the wall, or secured to an inner surface of the outer wall.

16. The system of claim 1, wherein the inner shield assembly is disposed between the interior chamber and the outer shield assembly.

17. The method of claim 8, wherein the inner shield assembly is disposed between the interior chamber and the outer shield assembly.

18. The spacecraft of claim 14, wherein the inner shield assembly is disposed between the interior chamber and the outer shield assembly.

19. The spacecraft of claim 1, wherein the inner shield assembly further comprises one or both of a base or a ceiling having one or more portions that are parallel to or perpendicular to the longitudinal axis.

20. The spacecraft of claim 14, wherein the inner shield assembly further comprises one or both of a base or a ceiling having one or more portions that are parallel to or perpendicular to the longitudinal axis.

* * * * *